Jan. 19, 1943.  M. CARTER  2,308,970

VULCANIZATION METHOD

Filed Aug. 2, 1941

Inventor

MITCHELL CARTER

By Clyo Frye

Attorneys

Patented Jan. 19, 1943

2,308,970

UNITED STATES PATENT OFFICE 2,308,970

VULCANIZATION METHOD

Mitchell Carter, Yardley, Pa., assignor to The Firestone Tire & Rubber Company, Akron, Ohio, a corporation of Ohio Application August 2, 1941, Serial No. 405,210

3 Claims. (Cl. 18—53)

The invention relates to vulcanizing rubber, especially to improvements in the vulcanization of rubber articles made directly from latex.

Heretofore rubber articles, especially solid or cellular rubber articles made from latex, have been vulcanized by immersing molds containing such rubber in hot water, or else the molds have been placed in a steam chamber filled with wet steam at atmospheric pressure. These vulcanization methods have successfully vulcanized the rubber, but they require lengthy vulcanization periods, so that even small articles require at least about one hour in the vulcanization chamber, or tank. Obviously the molds used in producing the articles are expensive and the longer they are used in the production of one article, the more molds are required to produce a given number of articles in a given time.

The general object of the invention is to provide a novel, improved vulcanization method overcoming the above and other disadvantages of previous methods of vulcanizing rubber articles made directly from latex.

A further object of the invention is to provide a vulcanization method which vulcanizes a given article more rapidly than is possible by previous vulcanization methods.

A further object of the invention is to provide a vulcanization method which functions to dry the articles produced while the articles are being vulcanized.

Figure 1:
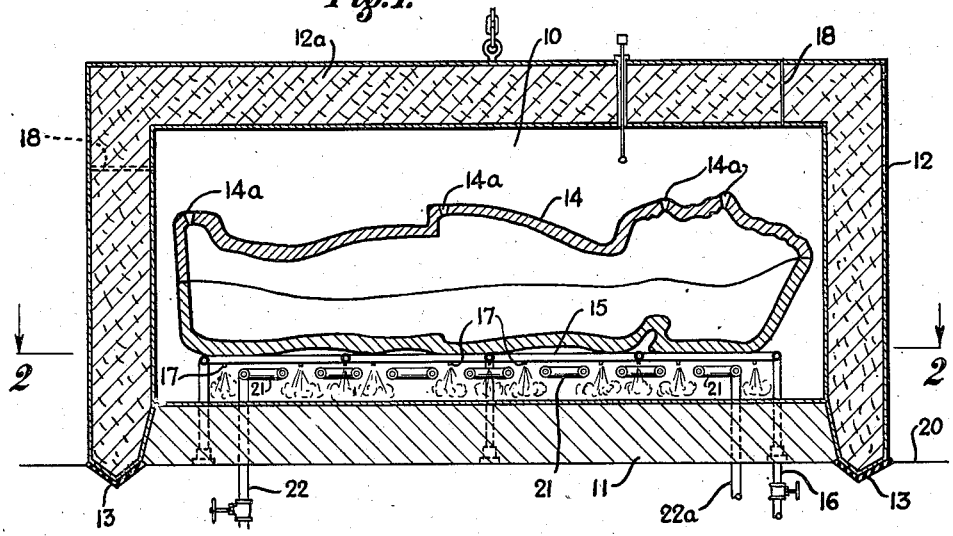
Figure 2:
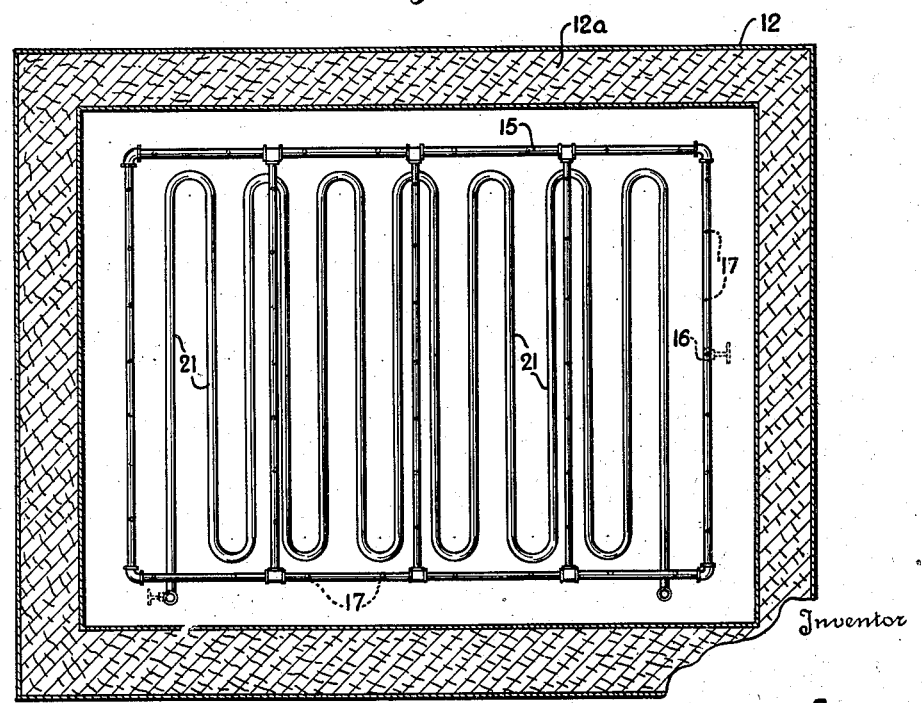

The foregoing and other objects will be manifest from the following specification, which is described with particular reference to the accompanying drawing, in which:

Figure 1 is a vertical sectional view of apparatus for practicing the invention and a mold therein; and Figure 2 is a horizontal sectional view on line 2—2 of Figure 1, with the mold removed.

Referring specifically to the drawing, a vulcanization chamber 10 is shown, which chamber is of any desired size and which has a base portion 11 that is mounted on a support 20 on which a cover 12 is removably supported. Suitable gaskets 13 may be positioned between the adjacent surfaces of the cover 12 and support 20, which may be recessed to receive the cover 12 to form a seal for the vulcanization chamber. A mold 14 having venting and filling holes 14a therein is positioned in the vulcanization chamber 10 and carried by tubular supports 15 which form a substantially rectangular frame therein.

In order to vulcanize any rubber contained within the mold 14, steam is introduced into the vulcanization chamber through a pipe 16 which connects to the tubular supports 15 which have apertures or jets 17 in their lower surfaces. Steam is exhausted from the chamber through a few small vents 18 in the cover 12. A particular feature of the present invention is the provision of means within the vulcanization chamber 10 for superheating steam contained therein. In this instance, such means may comprise a coiled pipe 21 mounted in the bottom of the vulcanization chamber and to which steam is fed through a pipe 22 and from which steam is exhausted through a pipe 22a. The steam contained in the pipes 21 and 22 must be at a higher pressure and therefore temperature than the steam within the vulcanization chamber 10, so that the steam within the chamber can be superheated by that in the pipe 21. Hence, transport of superheated steam is avoided and only a small quantity of the high pressure steam is required to superheat the low pressure steam. The low pressure steam should be substantially dry to facilitate the superheating thereof. It is highly desirable to have the vulcanization chamber 10 at atmospheric pressure, whereby the construction thereof is greatly simplified and may be made appreciably lighter and cheaper than vulcanization units operating under pressure. To this end, the vents 18 are formed in the walls of the vulcanization chamber.

The invention is of particular importance in producing cellular rubber articles from frothed latex, which is placed in the mold 14 positioned within the vulcanizing chamber 10. Heating the latex, or coagulants in the latex, then functions to gel the latex to form wet cellular rubber. A feature of the invention is that in vulcanizing this rubber, the superheated steam may dry it before appreciable vulcanization is effected. This is particularly true when atmospheric pressure is used in the vulcanization chamber, and the temperature of the superheated steam within the vulcanization chamber is kept a little above 100° C.

The drying of the latex before vulcanization thereof is effected is important, in that it gives enhanced tensile strength to the article produced, as more fully described in my copending application, Serial No. 405,209, filed August 2, 1941. When the latex has been dried, the amount of superheat of the steam in the vulcanization chamber may be increased to speed up the vulcanization process.

It may be desirable to form the vulcanization chamber 10 from very light material, such as sheet metal in which an inner and outer wall are provided, and rock wool 12a, or other insulating material is positioned between the walls. When such a vulcanization chamber is used, a temperature of approximately 230° C. was set up within the chamber, in one instance, and the outer wall of the chamber only had a temperature of 29° C. Obviously the higher the temperatures within the vulcanization chamber, the larger the amount of insulating material must be used between the inner and outer wall of the chamber. It will be seen that the superheated steam used usually should be produced at the same pressure as it is used in the vulcanizing chamber, because otherwise the steam would lose most of its superheat if it were produced under an elevated pressure and then allowed to expand into the vulvanization chamber, nor is it advisable to force the superheated steam into the chamber.

Steam at about 160° C. has been used in the practice of the invention and found very suitable. Steam at 160° C. contains 1181 B. t. u.'s per pound, while steam at 100° C. contains 1150 B. t. u.'s per pound, so that while the higher temperature steam contains only about 2.5% more heat than the steam at 100° C., this additional amount of heat is being constantly supplied thereto so as to maintain its temperature. Hence, rubber will be vulcanized much more rapidly at 160° C. than at 100° C., regardless of the small additional amount of heat present at such elevated temperature, because the rate of heat transmission between the steam and molded rubber is determined by the difference in temperatures of the two bodies. As long as there is any moisture in the latex rubber being vulcanized the temperature thereof cannot be raised to over 100° C., at 1 atmospheric pressure, as all of the water must be evaporated before the temperature can be increased. Due to the high temperature of the steam in the vulcanizing chamber, substantially all of the moisture in the latex rubber is usually driven therefrom during vulcanization. Obviously this simplifies producing rubber articles in finished form, or articles that are ready to be further processed, as the case may be.

If the temperature of the rubber has been raised to that of the superheated steam in the vulcanizer, very few, if any additional heat units are absorbed by the rubber and the flow of steam through the pipes 21 and 22 may be reduced. A minimum flow of steam through these pipes then would have to be maintained to compensate for radiation heat losses, etc.

The use of superheated steam is particularly desirable over the use of a similar fluid, such as air, in that steam contains many times more heat units than air of a given volume and also because the steam gives up such heat units more readily than air gives up its heat.

In view of the foregoing, it will be seen that the objects of the invention have been achieved and a novel vulcanization method has been provided by the invention.

While one embodiment of the invention has been completely illustrated and described herein, it will be appreciated that modifications hereof may be made without departing from the scope of the invention as defined in the appended claims.

What is claimed is:

1. That method of vulcanizing rubber comprising placing wet unvulcanized latex rubber in a vulcanization chamber, leading substantially dry steam into the vulcanizing chamber, and superheating the steam in the vulcanizing chamber while the chamber is open to the atmosphere to dry the rubber and increase the rate of vulcanization of the rubber.

2. That method of vulcanizing cellular rubber made from latex, said method comprising gelling the latex in cellular form, associating steam with the gelled latex, superheating the steam to raise the temperature thereof and dry same completely, and retaining the superheated steam at atmospheric pressure to prevent collapsing of the gelled latex.

3. That method of vulcanizing rubber made from latex, said method comprising gelling the latex to form wet rubber therefrom, associating superheated steam at atmospheric pressure with the wet gelled latex rubber to dry same, and retaining the superheated steam in association with the dried rubber to vulcanize same.

MITCHELL CARTER.